United States Patent [19]
Winkler

[11] 3,882,252
[45] May 6, 1975

[54] SHIRRED SAUSAGE CASING CLOSED AT ONE END AND METHOD OF MAKING SAME

[75] Inventor: Bruno Winkler, Oberflockenbach, Germany

[73] Assignee: Naturin-Werk Becker & Co., Weinheim, Germany

[22] Filed: Feb. 13, 1973

[21] Appl. No.: 331,755

[30] Foreign Application Priority Data
Feb. 16, 1972 Germany............................ 2207218
Sept. 28, 1972 Germany............................ 2247515

[52] U.S. Cl. ................ 426/140; 426/135; 426/138; 426/297; 426/390; 150/42; 156/110
[51] Int. Cl............................................. A22c 13/00
[58] Field of Search .......... 426/135, 138, 140, 105, 426/390, 297; 17/34, 35, 49; 150/42; 156/110

[56] References Cited
UNITED STATES PATENTS
2,890,121 6/1959 Rinehart ............................ 426/140
3,274,005 9/1966 Alsys.................................. 426/140

*Primary Examiner*—Hyman Lord
*Attorney, Agent, or Firm*—Burgess, Dinklage & Sprung

[57] ABSTRACT

An end closure for a shirred sausage casing is formed by gripping and compressing an end portion of the casing, and at least partially sealing the compressed portion. The gripping and compressing may be effected at or near the end of the casing.

14 Claims, 12 Drawing Figures

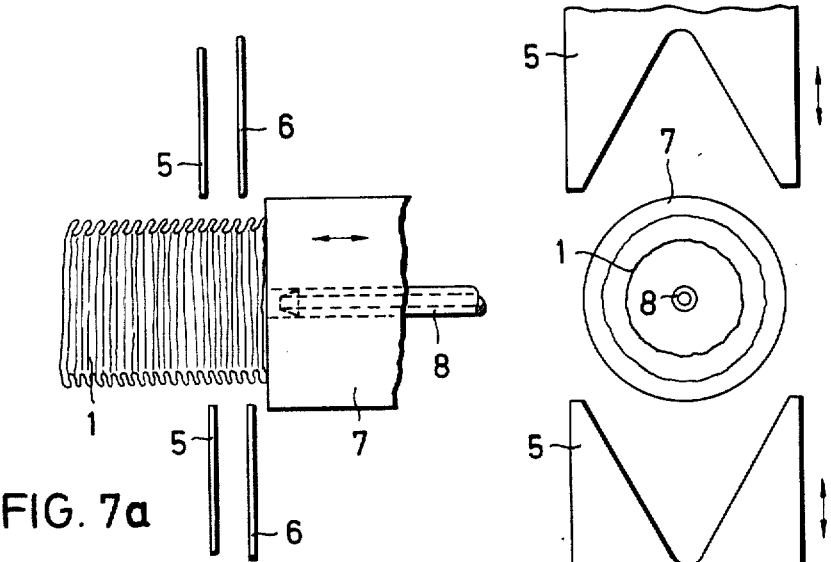
FIG. 7a
FIG. 7b
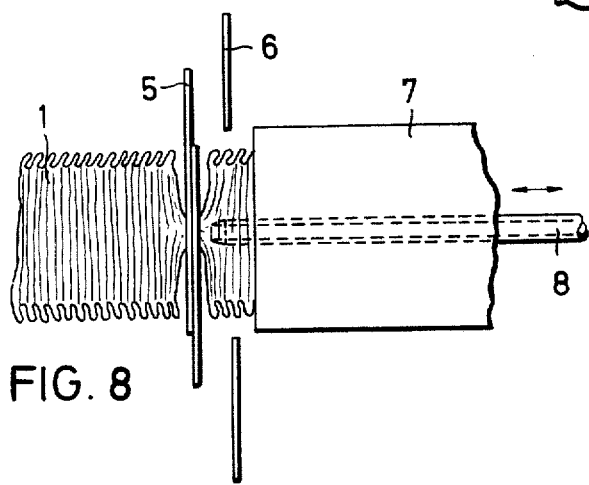
FIG. 8
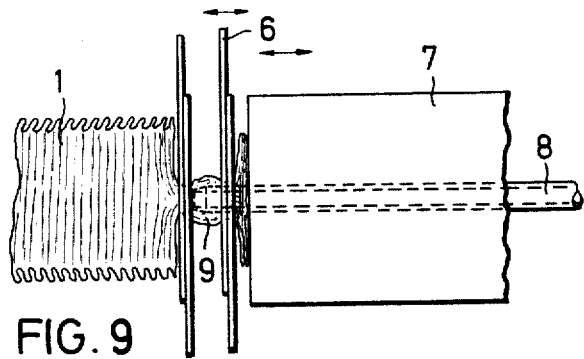
FIG. 9

SHIRRED SAUSAGE CASING CLOSED AT ONE END AND METHOD OF MAKING SAME

The invention relates to a shirred sausage casing closed at one end, a method of producing it and apparatus for carrying out the method.

Such shirred sausage casings closed at one end and made of edible material such as collagen fibres or of synthetic thermoplastic materials such as polyamides are particularly necessary in the case of fully automatic sausage-filling machines. It is necessary to close the casing at one end to enable it to be filled out by the pressure of the sausage meat and of course to prevent the sausage meat from passing through the open end of the casing during the filling operation. The mode of operation of fully automatic sausage-filling machines is such that the leading end of each fresh length of sausage casing is generally not completely filled since, when a new length of casing is introduced, the rotating pair of chains that form the sausage links cannot immediately be co-ordinated with the length of sausage casing to the extent necessary for effecting complete filling. The leading end of the length of casing is therefore generally formed by a portion which contains a varyingly reduced amount of filling and which is severed and scraped out for the purpose of recovering the filling.

On account of the need for recovering the filling from the incompletely filled leading end of the length of casing, the end closure should on the one hand be strong enough not to open during filling under the pressure of the filling material, while on the other hand, it should not be so strong that it cannot be opened at all except by cutting or tearing. This would make it difficult to recover the filling from the incompletely filled leading portion, which recovering operation is carried out by scraping the filling through the leading end. What is required instead is an end closure which while capable of withstanding the filling pressure nevertheless opens when a higher pressure is applied for the purpose of extracting the filling.

It is known practice to use a metal clip or a tied filament for closing one end of a shirred sausage casing made of synthetic material or an animal fibre composition. To prevent such end closure means, made of metal or consisting of a binding filament, from finding their way into the sausages during recovery of the filling material through the end of the length of casing, the end of the casing has, in the past, been closed by means of a knot. In the case of another known end closure the shirred end is twisted by a rotatable closure-forming element, while the remaining part of the casing is held fast. It is also known for the end of the casing to be formed by a plug-like sealing element which is fitted inside the sausage casing and is made of the same material as the end portion of the casing. In this system, the end portion of the casing is either turned over inwards and then twisted tight or it is pulled over to cover the mouth of the casing and is compressed into the form of a plug by means of a plunger. Whereas the above-described end closure means are completely tight, at least one air-permeable end closure has previously been proposed and is obtained by crimping the end of a shirred sausage casing and pushing it into the bore of the casing.

The previously proposed end closures described above require a relatively large amount of casing material for their formation. A known practice aimed at reducing the amount of material used for this purpose is that of forming the end closure by stretching a small part of the shirred sausage casing at the end that is to be closed until the traverse folds are flattened out, then forming longitudinal folds in the flattened portion, compressing the folds and holding them in the compressed position by means of an adhesive tape. The adhesive tape is wound around the folds, of the folds, while being compressed, are moved to a position between two adhesive tapes of which the gummed surfaces face each other. The folds, held in position by the adhesive tape, can then be pushed into the interior of the casing.

In the majority of the known end-closure means too much casing material is required for forming the seal. Furthermore, complicated apparatus and procedures are required for gripping the end of the shirred casing in order to form the seal by turning over the end and twisting or by crimping and stuffing the so deformed portion into the interior of the casing. In the case of the known closure for which a smaller quantity of casing material is required for forming it and in which a small portion of the shirred end is stretched out, folded and, in the folded condition, wound with adhesive tape, there exists the danger that during scraping for the purpose of recovering the sausage meat from the filled portion of the casing, the adhesive tape may find its way into the sausage meat which sausage meat is intended for re-use.

The object of the present invention therefore is to provide an end closure which is economical in material, does not employ troublesome foreign materials such as adhesive tapes, wire clips and binding threads, is strong enough to withstand the pressure at the moment of filling, and can be produced in a simple manner.

The present invention provides a shirred sausage casing which is closed at one end and is made of an edible material, a cellulosic material or a synthetic thermoplastic material, the end seal of the casing having been formed by the compressed shirred end which is at least partially closed by adhesive means while in the compressed and shirred condition.

It will be appreciated that, although the casing according to the invention is primarily intended for sausages, it can be used for other food materials.

It is not necessary for the end closure to be watertight or water-resistant. It suffices if the compressed shirred end is sealed by adhesive means at a few points only. The seal only has to be strong enough to withstand the pressure occurring at the moment of filling, since the first small portion of sausage meat in the filled length of casing has to be scraped out again in any event.

Approximately 2 to 3 transverse folds are generally required in the forming of the end closure in accordance with the invention.

Advantageously, the closure is formed by compressing and sealing the shirred casing by adhesive means near the end that is to be sealed. The closure is then located at a short distance from the end of the casing. In this arrangement the closure is preferably formed by a portion of the casing which is clamped or compressed at two points, one a short distance behind the other, and which, between these points, is closed by adhesive means.

The present invention also provides a method of closing one end of a shirred sausage casing, in which the shirred end that is to be closed is compressed and, while in the compressed and shirred condition, is closed at least partially by means of an adhesive.

The shirred end that is to be closed can be compressed in any suitable manner. Thus, for example, the casing may be gripped around its entire periphery by means of a round gripping tool and compressed thereby. However, for gripping the end of the casing use is preferably made of a tool in the form of a pair of pincers which grip and compress the casing at only two opposite sides.

The adhesive for closing the compressed end may be applied in any suitable manner. A liquid adhesive can be supplied through a small pipe which is disposed along the longitudinal axis of the casing and releases, when required, by means of suitable dispensing devices, the amount of adhesive necessary for closing the end of each casing.

In principle, the adhesive can be applied before, during and/or after the end of the casing has been compressed. If the adhesive is applied before or during compression of the casing it has to be passed onto it from one side. Upon compression of the casing the adhesive is then distributed over the areas hitherto not covered with adhesive. If the adhesive is applied after the casing has been compressed then in the event of the adhesive being supplied through the end that has to be closed, this end should be incompletely compressed, so that the adhesive can reach the required area. In an especially simple arrangement, the compression of the end of the casing and the feed of adhesive are coordinated by allowing a few spots of glue to drop between the pressed-together folds while compression is taking place, the glue subsequently hardening to provide the required bond.

Advantageously, the compressed end to which adhesive has been applied may be tucked into the interior of the casing for conveying purposes. This prevents the projecting gummed ends from causing trouble during conveying, and allows the adhesive to set completely. In the case where the end is compressed by means of pincers and the adhesive is supplied through a small tube, tucking-in of the compressed ends can readily be achieved by pushing the pincers, or the pincers and the tube, a little distance into the mouth of the casing. The compressed folds of the casing wetted with glue remain inserted in the mount of the casing, so that it is possible to prevent the portion to which glue has been applied from opening up as a result of slow hardening of the adhesive.

In order to form an end closure by glueing the compressed casing near one of its shirred ends, the shirred sausage casing is gripped and clamped or compressed at a point a short distance away from its end and is gripped a second time at a short distance beyond the first gripping point in the direction of the end of the casing, and adhesive is applied to the portion defined by the two gripping points, and this portion is compressed in the direction of the longitudinal axis of the casing. The first gripping point is generally located at a distance from the end of the casing that is equal to the space occupied by approximately 3 to 6 transverse folds. Depending upon the type of clamping device used approximately 5 to 6 cm of stretched casing are required for effecting the clamping. Preferably, clamping is achieved by means of a double slide which is mounted in a plane at right angles to the longitudinal axis of the sausage casing. The two parts of the double slide operate in opposite directions and from opposite sides. They slide one upon the other and each contains an opening, preferably in the form of the apex of a rounded triangle, which upon compression brings about the constricting or clamping action.

Construction or clamping can also be carried out in other ways, for example, with the aid of a wire loop or an annular diaphragm.

The second clamping action is applied just beyond the first and nearer to the end of the casing; it is preferably achieved in the same manner as the first clamping action.

The glue is preferably applied from the end that is to be closed. An especially suitable glue-delivery means for this purpose comprises a small pipe which is connected to a glue-dispensing means. The glue-delivery means is preferably displaceable in a direction concetric with the sausage casing and in the direction of the longitudinal axis of the casing.

A further possible way of supplying the glue consists in piercing the casing in the portion between the two clamping points, and injecting the adhesive. Such piercing may be effected, for example, with a canule.

When the glue is supplied through a coaxial pipe, the material of the casing is compressed at the second clamping point only until the remaining space is approximately equal to the diameter of the pipe, and clamping is only completed after penetration of the glue and withdrawal of the pipe.

After the adhesive has been introduced and the second clamping action started or completed, the portion of the casing between the two clamping points and containing the adhesive is compressed in order to distribute the adhesive over the entire occluded inner surface of the balloon formed in the casing by the two clamping points. Compression may be achieved by making one clamping element (for example, a double slide), displaceable in the longitudinal direction of the casing, and by pressing this displaceable clamping element towards the other (fixed) clamping element (which may be, for example, a fixed double slide). Compression of the portion between the two clamping points is preferably effected by means of a plunger which, together with the movable double slide, is pressed from the closed end towards the fixed first clamp.

It will, of course, be appreciated that the adhesive should be a product to which there is no physiological objection, for example, gelatine, starch, gum arabic, casein or collagen. Since the end closure means should not be too strong (so as to facilitate the recovery of the filling by scraping it from the leading portion of the casing), a suitable adhesive is one that is softened by the juice from the sausage material. Water-soluble adhesives, or those that are capable of swelling, are preferred. To achieve the bonded closure as rapidly as possible it is preferred to use quick-setting adhesives.

The invention further provides apparatus for closing one end of a shirred sausage skin by producing an end closure which is formed by the compressed shirred end which is at least partially closed by adhesive means while in the compressed and shirred condition. The apparatus comprises a tool, preferably in the form of a pair of pincers, for gripping and compressing the end of the casing to be closed, and a supply element for adhesive, which element is preferably in the form of a tube.

The means for gripping the end of the casing and the adhesive-supply means are preferably arranged for synchronous movement towards and away from the casing, and the end-gripping and compressing means should project slightly beyond the pipe supplying the adhesive.

Several forms of method in accordance with the invention for producing end-closures in shirred sausage casings, and apparatus according to the invention for carrying out the methods, will now be described, by way of example, with reference to the accompanying drawings, in which:

FIGS. 7a and 8 to 10 are side views of apparatus for performing a second method at various stages thereof;

FIG. 7b is a vertical sectional view taken slightly to the left of element 5 in FIG. 7a.

Figure 1:
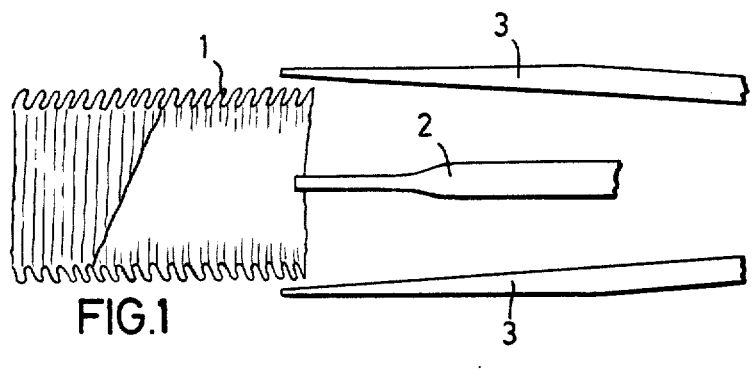
FIGS. 1 to 4 are side views of various stages of one method.

Referring firstly to FIGS. 1 to 6 generally, the reference numeral 1 designates a shirred sausage casing, the numeral 2 a small metal pipe for supplying adhesive, the numeral 3 a pincer-like tool for gripping and compressing the leading end of the shirred casing, and the numeral 4 indicates drops of the adhesive.

FIG. 1: the opened pincers 3 and the small pipe 2, which is tapered towards its forward end, are moved from the non-operating position (shown in FIG. 4) and to the left towards the shirred casing 1 far enough to enable the pincers 3, when subsequently closed, to grip 2 to 3 folds of the casing.

Figure 2:
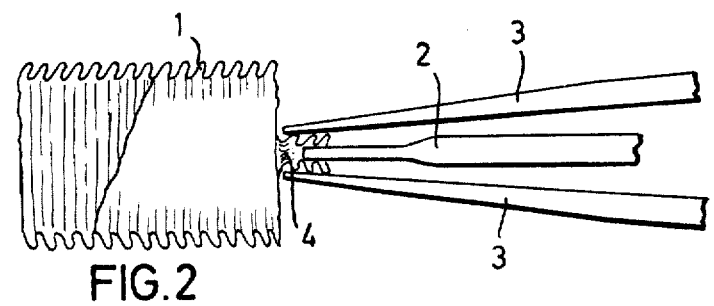

FIG. 2: the pincers 3 are closed, thereby compressing two to three folds of the shirred casing 1. A few drops of glue are placed between the compressed folds by way of the pipe 2.

Figure 3:
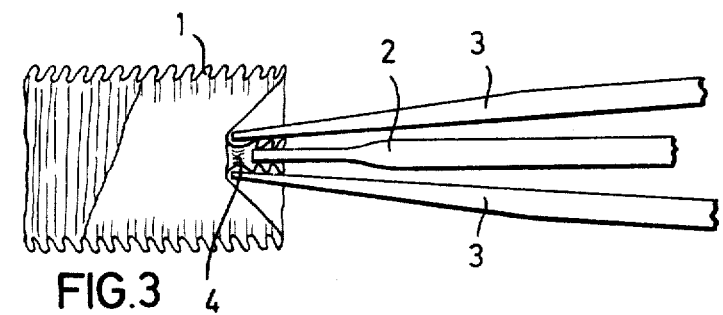
Figure 6:
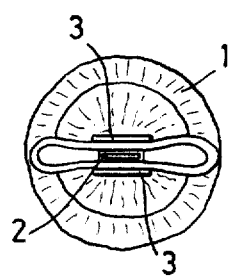
FIG. 6 is a plan view of the compressed casing end shown in FIGS. 2 and 3.

FIG. 3: the pincers 3 and the pipe 2 are moved synchronously further to the left and push the compressed folds, now wetted with glue, into the mouth of the shirred casing for a distance of about 8 to 12 mm. The end configuration produced as shown in FIGS. 2 and 3 is shown in FIG. 6, which is a plan view.

Figure 4:
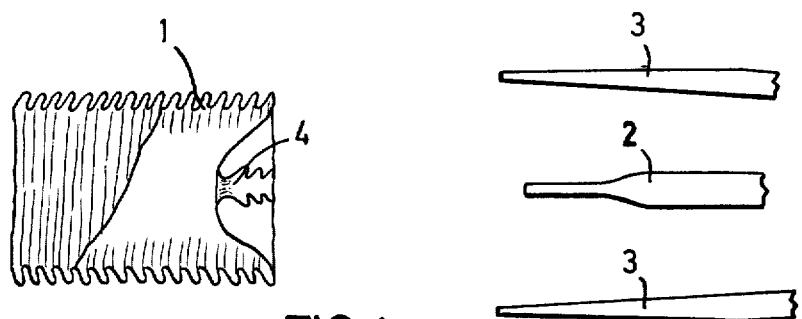

FIG. 4: the pipe 2 and the pincers 3, which are now open, have been moved back to the right into their initial positions. The compressed folds of the casing that are wetted with glue remain fixed in the mouth of the casing. The shirred portion of the casing surrounding this glued part prevents the latter from opening up. The shirred casing closed in this manner can then be packaged. The glue dries completely during packaging.

Figure 5:
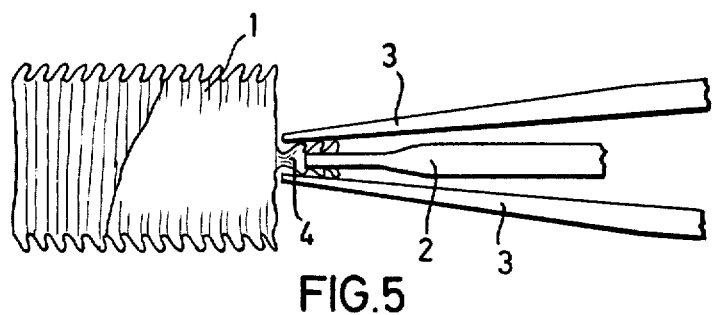
FIG. 5 is a side view showing one stage of a modified form of the first method.

FIG. 5 shows an arrangement in which the end closure is not displaced inwardly after the application of the adhesive. The pipe 2 for supplying the adhesive need not have a tapered portion if it is already fine enough for the intended purpose.

The methods described with reference to FIGS. 1 to 6 may be modified by further compressing the folds after the pipe supplying the adhesive has been retracted.

The apparatus shown in FIGS. 7 to 10 is designed for producing the form of end closure obtained by closing the compressed casing by adhesive means near the shirred end, and comprises two tools 5 and 6 spaced a short distance apart for gripping and clamping the casing. The tools are fitted in a plane perpendicular to the longitudinal axis of the shirred sausage casing 1, and preferably take the form of a double slide or a pair of pincers. A plunger 7 is disposed on the longitudinal axis of the shirred casing, and serves to hold the casing in its initial position and subsequently to compress it. Adhesive-supply means 8 comprises a supply pipe disposed on the longitudinal axis of the sausage casing.

FIG. 7a shows a portion of the shirred sausage casing 1, the clamping tools 5 and 6 spaced a short distance apart near the end of the casing, each taking the form of a double slide disposed at right angles to the longitudinal axis of the casing, and the plunger 7, which is movable on the longitudinal axis of the casing and serves to hold the end of the casing to be closed in its initial position. Fitted in a central bore in the plunger 7 is a small adhesive-feed pipe 8 which is displaceable relatively to the plunger on the longitudinal axis of the casing and is connected to a unit (not shown) for storing and dispensing adhesive, which unit delivers the particular quantity of adhesive required.

FIG. 7b shows a cross-section through the apparatus. The double slide 5, which is movable in a plane perpendicular to the longitudinal axis of the sausage casing 1, is formed with V-shaped openings of which the sides exert the clamping effect when the two slides are moved together.

In FIG. 8 the parts of the double slide 5 have been slid together and clamp approximately 5 to 6 cm of stretched casing. The length of casing required for effecting its closure can be set by adjusting the plunger 7. The pipe 8 supplying adhesive has been moved relative to the plunger 7 and towards the first clamping point.

FIG. 9: the parts of the double slide 6 are slid together to clamp the end of the casing at a second position, and the slide surrounds the adhesive supply pipe 8; a balloon 9 is formed in the sausage casing between the slides 5 and 6. Two or three spots of adhesive are delivered through the pipe 8. In this position the adhesive is prevented from escaping by the slides 5 and 6.

Figure 10:
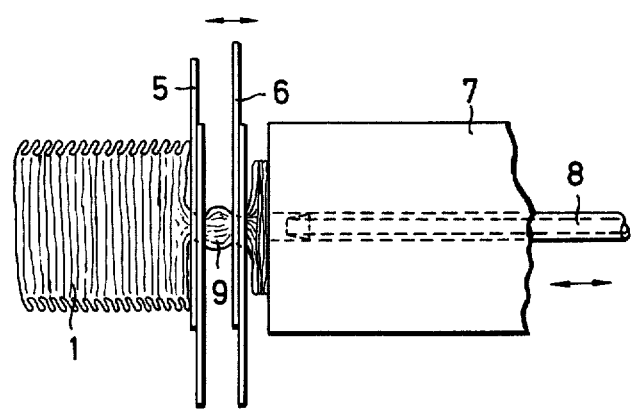

FIG. 10: the pipe 8 for supplying adhesive is moved to the right and the slide 6 is closed round the pipe. The slide 6 and the plunger 7 are moved to the left and thus pressed against the slide 5. The adhesive occluded in the ballon formed in the casing is thus distributed over the entire occluded inner surface of the casing.

Figure 11:
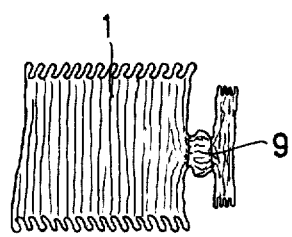
FIG. 11 is a side view of the product of the second method.

FIG. 11 shows the fully closed shirred casing after the slides 5 and 6 and the plunger 7 have been returned to their initial positions.

All the known materials hitherto used for sausage casings, such as cellulose, alginate, or synthetic materials such as polyamides, polyvinyl alcohols and polyesters are suitable for making sausage casings in accordance with the invention. Especially preferred, however, are casings made of edible material (collagen).

I claim:

1. A shirred food casing suitable for holding sausage meat closed at one end comprising a food casing material, the closure being an end portion of the casing compressed to provide compressed folds adjacent the axis of the casing, the closure being at least partially sealed by a physiologically tolerable adhesive placed between the compressed folds, the seal being strong enough to withstand the pressure occurring at the moment of filling the casing with food, and the adhesive being softened by juice from sausage meat.

2. A shirred food casing as claimed in claim 1 wherein the end closure comprises approximately two to three transverse folds of the shirred casing said two to three transverse folds being 5 to 6 cm. of stretched casing.

3. A food casing as claimed in claim 1 wherein the end closure is pushed into the interior of the casing.

4. A food casing as claimed in claim 1, wherein the end closure is formed by a portion of the casing which is compressed at two points, one a short distance behind the other, the said portion having been at least partially closed between those two points with said adhesive material.

5. A food casing as claimed in claim 1, wherein the adhesive material is a member of the group consisting of gelatine, starch, gum arabic, casein and collagen.

6. A method of closing a food casing suitable for holding sausage meat at one end thereof so that said one end is sealed to withstand the pressure occurring at the moment of filling the casing with food, comprising gripping an end portion of the casing, compressing the gripped portion at at least one point to provide compressed folds adjacent the axis of the casing, and at least partially sealing the closure by placing a physiologically acceptable adhesive between the compressed folds, said adhesive being softened by juice of sausage meat.

7. A method as claimed in claim 6, wherein the casing is gripped and compressed at only one point at the end to be closed.

8. A method as claimed in claim 7, and tucking the gripped and compressed end of the casing into the interior of the casing for setting of the adhesive in the compressed folds.

9. A method as claimed in claim 6, wherein the shirred casing is clamped a second time at a short distance from the first clamping point while the casing is being clamped at the first clamping point, adhesive is applied in the portion of the casing between the two clamping points, and the casing is thereafter compressed toward the longitudinal axis of the casing to secure the adhesive between the two clamping points.

10. A method as claimed in claim 9, wherein said compression toward the longitudinal axis is not completed until adhesive has been applied.

11. A method as claimed in claim 9, wherein clamping at the first and second clamping points is effected respectively with first and second clamping means, and compression of the doubly clamped adhesive-containing portion is effected by moving one of the clamping means longitudinally relative to the other.

12. A method as claimed in claim 6, wherein the adhesive material is a member of the group consisting of gelatine, starch, gum arabic, casein, and collagen.

13. A method as claimed in claim 6, wherein the casing is gripped and clamped at another point along the end portion of the casing, said compressed folds being formed between the two clamping points, said sealing being effected by adhesive disposed between said compressed folds between the two clamping points.

14. A method as claimed in claim 13, wherein after said placing of the adhesive, and while the end portion is clamped at the two points, the casing between the two clamping points is compressed.

* * * * *